(12) United States Patent
Nakamura et al.

(10) Patent No.: US 6,954,932 B2
(45) Date of Patent: Oct. 11, 2005

(54) PROGRAM CONTROL SYSTEM AND PROGRAM CONTROL METHOD

(75) Inventors: Atsushi Nakamura, Yokohama (JP); Hitoshi Yui, Yokohama (JP); Jun Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 773 days.

(21) Appl. No.: 09/811,404

(22) Filed: Mar. 20, 2001

(65) Prior Publication Data

US 2001/0049751 A1 Dec. 6, 2001

(30) Foreign Application Priority Data

May 30, 2000 (JP) ........................................ 2000-164719

(51) Int. Cl.[7] .................................................. G06F 3/00
(52) U.S. Cl. ........................ 719/313; 719/328; 709/217; 705/1
(58) Field of Search ................................. 717/136, 151, 717/104; 703/6; 713/310, 311, 312, 313, 328; 709/203, 217, 246; 705/7

(56) References Cited

U.S. PATENT DOCUMENTS

| | | | | |
|---|---|---|---|---|
| 5,963,731 A | * | 10/1999 | Sagawa et al. | 703/6 |
| 6,141,697 A | * | 10/2000 | Hale et al. | 719/312 |
| 6,275,977 B1 | * | 8/2001 | Nagai et al. | 717/104 |
| 6,289,391 B1 | * | 9/2001 | Smith et al. | 719/312 |
| 6,591,414 B2 | * | 7/2003 | Hibi et al. | 717/151 |
| 6,748,584 B1 | * | 6/2004 | Witchel et al. | 717/136 |

FOREIGN PATENT DOCUMENTS

| | | |
|---|---|---|
| JP | A-7-134693 | 5/1995 |
| JP | A-2000-29956 | 1/2000 |

* cited by examiner

*Primary Examiner*—St. John Courtenay, III
*Assistant Examiner*—Van Nguyen
(74) *Attorney, Agent, or Firm*—Mattingly, Stanger, Malur & Brundidge, P.C.

(57) ABSTRACT

A system and a method, capable of executing a process operation by using a plurality of applications, are provided. While a corresponding relationship of data used in these applications is previously defined, a data converting unit converts data about an execution result of an application. An application initiating unit executes another application by using the converted data. The present invention has an object to provide both a system and a method, capable of controlling an execution of an application program, while data can be transferred/received among plural application programs having no specific relationship with each other. Furthermore, the present invention has another object to provide both a workflow system and a workflow method, capable of utilizing application programs which are different from each other every process previously defined in the workflow.

3 Claims, 13 Drawing Sheets

FIG. 3

PROCESS DATA MAPPING INFORMATION TABLE 301

WORK ITEM 3
WORK ITEM 2
WORK ITEM 1 — 302

| | DATA PRESENT/ABSENT | DATA ITEM NAME LIST | TYPE IDENTIFIER LIST |
|---|---|---|---|
| READING TIME | PRESENT | "PRODUCT NAME" "QUANTITY" "PRICE" | CHARACTER STRING BYTE STRING BYTE STRING |
| WRITING TIME | ABSENT | — | — |

FIG. 4

TRANSLATOR MAPPING INFORMATION TABLE (401)

WORK ITEM 3
WORK ITEM 2
WORK ITEM 1 (402)

| | CONVERSION REQUIRED/ NOT REQUIRED | CONVERSION SOURCE TYPE LIST | CONVERSION DESTINATION TYPE LIST |
|---|---|---|---|
| INPUTTING TIME | REQUIRED | CHARACTER STRING<br>BYTE STRING<br>BYTE STRING | BYTE STRING<br>BYTE STRING<br>BYTE STRING |
| OUTPUTTING TIME | NOT REQUIRED | — | — |

FIG. 8A

| | DATA PRESENT/ABSENT | DATA ITEM NAME LIST | TYPE IDENTIFIER LIST |
|---|---|---|---|
| READING TIME | PRESENT | PRODUCT CODE, QUANTITY, UNIT PRICE | BYTE STRING BYTE STRING BYTE STRING |
| WRITING TIME | ABSENT | — | — |

FIG. 8B

| | DATA PRESENT/ABSENT | DATA ITEM NAME LIST | TYPE IDENTIFIER LIST |
|---|---|---|---|
| READING TIME | ABSENT | — | — |
| WRITING TIME | PRESENT | PRODUCT MODEL, QUANTITY, UNIT PRICE | BYTE STRING BYTE STRING BYTE STRING |

FIG. 9A

| | CONVERSION REQUIRED/ NOT REQUIRED | CONVERSION SOURCE TYPE LIST | CONVERSION SOURCE TYPE LIST |
|---|---|---|---|
| INPUTTING TIME | NOT REQUIRED | — | — |
| OUTPUTTING TIME | REQUIRED | BYTE STRING<br>BYTE STRING<br>BYTE STRING | BYTE STRING<br>BYTE STRING<br>BYTE STRING |

FIG. 9B

| | CONVERSION REQUIRED/ NOT REQUIRED | CONVERSION SOURCE TYPE LIST | CONVERSION SOURCE TYPE LIST |
|---|---|---|---|
| INPUTTING TIME | REQUIRED | BYTE STRING<br>BYTE STRING<br>BYTE STRING | BYTE STRING<br>BYTE STRING<br>BYTE STRING<br>—<br>QUANTITY x UNITPRICE |
| OUTPUTTING TIME | NOT REQUIRED | — | — |

PROGRAM CONTROL SYSTEM AND PROGRAM CONTROL METHOD

BACKGROUND OF THE INVENTION

The present invention is related to a system for controlling an execution of a computer program, and also to a method for controlling an execution of a computer program.

JP-A-2000-29956 discloses such a conventional technique that the existing application programs are controlled by way of the workflow system. In this prior program control system, the cession handle containing the cession program by which the commencement/commitment of the transaction of the application program can be described excutes processes of the application according to a request of a client. By this, one process is accomplished, while the workflow is executed, by controlling the existing application programs by the workflow system via a plurality of clients.

SUMMARY OF THE INVENTION

An application program is not always formed under such an initial condition that the execution result of this application program is used in another different application program. As a result, such application programs having no specific relationship with each other cannot be mutually utilized within one process operation.

The above-described conventional technique describes such a control system that the existing application programs are controlled by the workflow system. However, this prior art never discloses the concrete data transfer/reception operations executed among the existing application programs.

The present invention has been made to solve such a problem, and therefore, has an object to provide both a system and a method, capable of controlling an execution of an application program, while data can be transferred/received among plural application programs having no specific relationship with each other.

Furthermore, the present invention has another object to provide both a workflow system and a workflow method, capable of utilizing application programs which are different from each other every process previously defined in the workflow.

As a consequence, in accordance with the present invention, more complex and higher process operations can be executed in a simple manner.

The above-described objects may be achieved by comprising a converting unit and an executing unit. The converting unit executes such a converting operation is such a manner that an execution result of a first application program can be used in a second application program. The executing unit executes a second application program by using the converted execution result.

It should be understood that the converting unit may be arranged by employing such a converting program capable of utilizing the execution result of the first application program by the second application program.

BRIEF DESCRIPTION OF THE DRAWINGS

A more better understanding of the present invention may be made by reading a detailed description of the invention in conjunction with the accompanying drawings, in which:

FIG. 3 illustratively shows a process data mapping information table;

FIG. 4 illustratively indicates a translator mapping information table;

FIG. 8A and FIG. 8B illustratively indicate a process data mapping information table used to execute the business process of FIG. 7;

FIG. 9A and FIG. 9B illustratively represent a translator mapping information table used to execute the business process;

DESCRIPTION OF THE EMBODIMENTS

Now, the present invention will be described.

Figure 10:
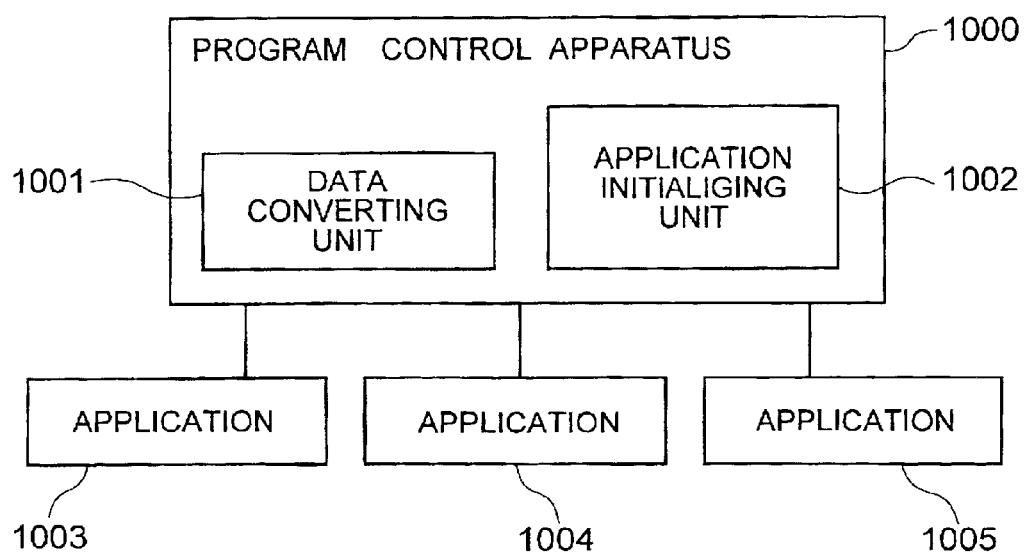
FIG. 10 schematically indicates a basic arrangement of the present invention.

FIG. 10 schematically indicates a basic arrangement of a program control system according to the present invention. The program control system is arranged by a program control apparatus 1000, and a plurality of application programs (will be simply referred to as "application" hereinafter) 1003, 1004, and 1005. The program control apparatus 1000 is arranged by a data converting unit 1001 and an application initiating unit 1002. The data converting unit 1001 previously defines formats and contents of data with respect to each other, which are used in various applications, in order that the data can be utilized among these applications, and converts the formats/contents of the data based upon this definition. The application initiating unit 1002 defines initializing process operations of the respective applications, process operations executed when the applications are ended, and execution sequences of application programs.

As an example of the above-described initializing process operations of the applications, the following process operations may be executed. For instance, an application is initiated. An initializing process/receiving process operation of data is performed when an application is initiated. An initializing process operation is performed when a communication is carried out by using an application. A connection process operation of a communication connection is carried out. An object reference is acquired. An inquiry registration process operation for a naming service is performed. Also, other process operations may be used as the initializing process operation.

Also, as an example of the above-explained ending process operation of the application, the following process operations may be executed. For instance, a transmission process operation of a process result of an application is carried out as a reprocess operation of the application ending operation. A storage process operation of the application process result is performed. A close process operation of a communication connection is performed. An open process operation of an acquired object reference is performed. Information which is registered to an application service is deleted. Also, other process operations may be carried out as the ending process operation.

Next, in this program control system, a description is made of control operations thereof in this order of the application 1003, the application 1004, and the application 1005. The application initiating unit 1002 executes an initializing process operation of the application 1003, and next executes this application 1003. When the process operation of the application 1003 is ended, the application initiating unit 1002 executes an ending process operation, and transfers the data of the application 1003 to the data converting unit 1001. The data converting unit 1001 converts the data of the application 1003 into the data of the application 1004 based upon the formats/contents of the data as to both the application 1003 and the application 1004, which are previously made in correspondence with each other. The data converted in this manner is again sent to the application initiating unit 1002. The application initiating unit 1002 executes the initializing process operation of the application 1004, and initiates this application 1004 so as to enter the converted data to the application 1004. When the process operation of the application 1004 is ended, the application initiating unit 1002 executes an ending process operation and transfers the data of the application 1004 to the data converting unit 1001. The data converting unit 1001 similarly converts the data of the application 1004 into the data of the application 1005 based upon the formats/contents of the data as to both the application 1004 and the application 1005, which are previously made in correspondence with each other. The data converted in this manner is again sent to the application initiating unit 1002. The application initiating unit 1002 executes the application 1005. It should be noted that in this embodiment, the execution order of the applications is defined by the application initiating unit 1002. Alternatively, the execution order of the applications may be controlled by other control systems and other programs (including application program).

Further, FIG. 10 does not discloses a computer on which the applications are initiated. Also, the above-explained program control system may be realized by using a single set of computer, or by employing a plurality of computers, a plurality of portable terminals/telephones connected via a network to each other.

Next, a description will now be made of a case that this program control system is applied to a workflow system.

Figure 1:
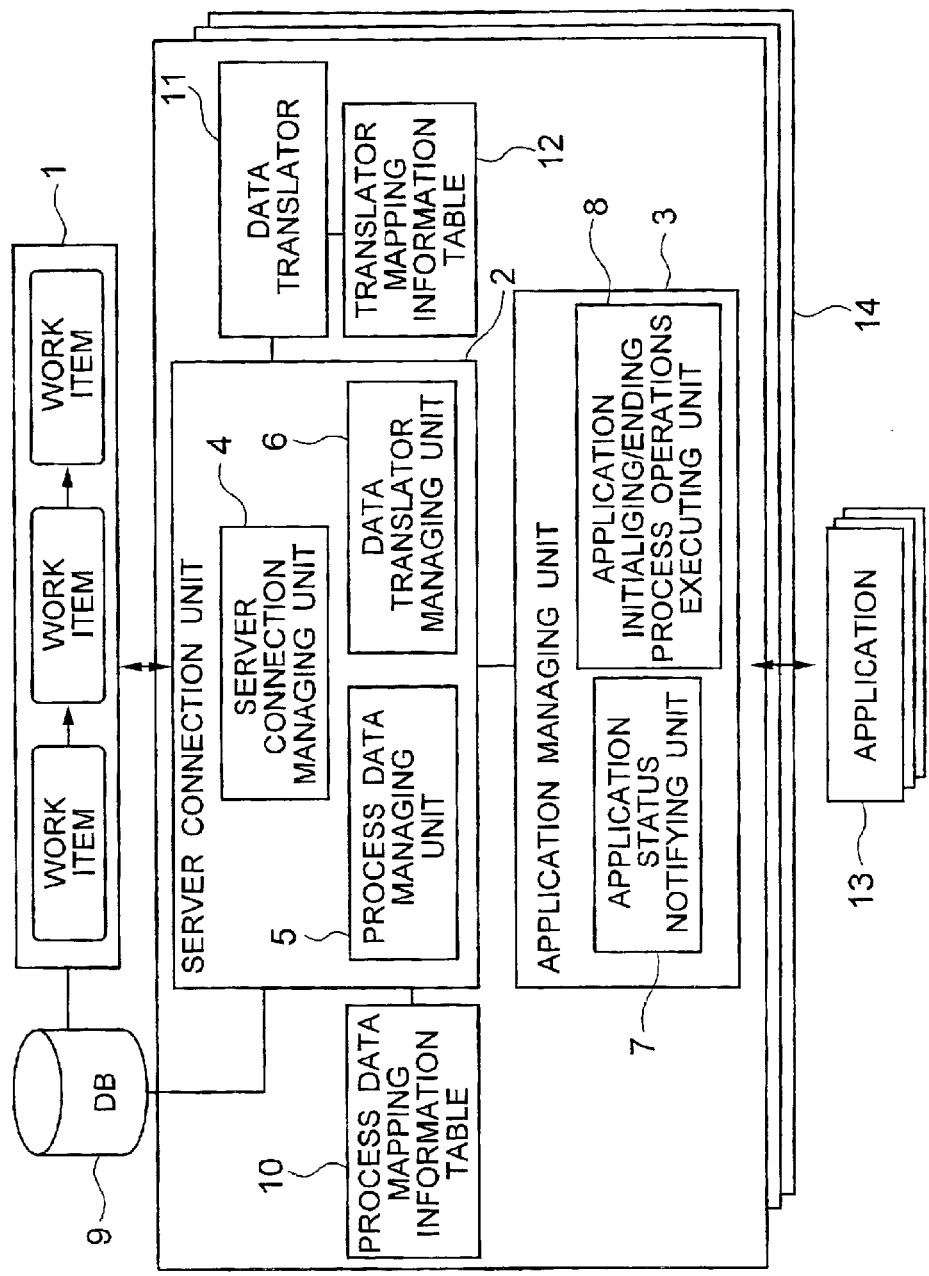
FIG. 1 is a schematic block diagram for representing a structural example of a workflow system to which the present invention has been applied.

FIG. 1 schematically indicates an overall arrangement of a workflow system to which the present invention is applied. This workflow system is arranged by a workflow managing server 1, a database 9, an application 13, and a plurality of application-integration apparatus 14. The application integration apparatus 14 manages data communications among the workflow managing server 1 and a plurality of applications 13.

The workflow managing server 1 executes a process operation in accordance with workflow process relevant data on which contents of work items and execution sequences of work items are defined in advance. Also, in the workflow managing server 1, the process operation is carried out in such a manner that, for instance, flow data such as document data are transferred from a certain work item to another work item based upon the workflow process relevant data on which the execution sequence of the work items is previously defined. This document data is related to voice data, moving picture (moving image) data, and various electronically-processed files. The flow data is related to data which constitutes such data to be processed in a series of work item flows, or such data which is circulated. The workflow process relevant data and the flow data are stored as process data in the database 9, and are read/written by the workflow managing sever 1 and the application integration apparatus 14.

The application integration apparatus 14 is constructed of a server connecting unit 2, an application managing unit 3, a process data mapping table 10, a translator 11, and a translator mapping information table 12. The server connecting unit 2 manages a connection between the own unit 2 and the workflow managing server 1, and executes managing/converting operations of process data which is handled by the workflow managing server 1. While a user provides an interface of a process operation specific to an application 13 installed therein and also notifies an execution status of an application to the workflow managing server 1, the application managing unit 3 is operated by that the workflow managing server 1 can change a work status.

The server connection unit 2 further contains a server connection managing unit 4, a process data managing unit 5, and a data translator managing unit 6. The application managing unit 3 contains an application status notification unit 7, and an application initializing/ending process executing unit 8.

While the workflow managing server 1 is operated in connection with the application 13, the server connection managing unit 4 commences the connection, and holds, or maintains the connected status. At this time, in order to answer to a plurality of requests issued from the application 13, the server connection managing unit 4 may previously maintain a plurality of connections.

In the process data mapping information table 10, work items which are executed in the workflow managing server 1, and also items of flow data are previously stored in correspondence with each other.

The process data managing unit 5 derives flow data from the process data stored in the database 9 by using the process mapping information table 10, and then supplies the derived flow data to the data translator managing unit 6. Also, the process data managing unit 5 adds the flow data received from the data translator managing unit 6 to the workflow process relevant data, and then stores this added data into the database 9 as process data.

The data translator managing unit 6 requests the externally provided data translator 11 to convert the flow data accepted from the process date managing unit 5 into such date specific to the application 13. Also, the date translator managing unit 6 requests the externally provided data translator 11 to convert the flow data accepted from the application managing unit 3 into such date specific to the application 13. The translator mapping information holding unit 12 previously holds a correspondence relationship between the flow data and the data specific to the application. Upon receipt of a request issued from the data translator managing unit 6, the data translator 11 executes the data converting operation by utilizing the translator mapping information table 12. In other words, while utilizing the data translator managing unit 6, the data translator 11, and the translator mapping information table 12, such data which may be used in the workflow managing server 1 is converted into such data which may be utilized in the application 13. Also, such data which may be used in the application 13 is converted into such data which may be utilized in the workflow managing server 1.

In the case that there are plural applications which are executed in a single work unit, such data converting operations which may be utilized in the respective applications may be carried out. That is to say, in such a case that an application "B" is executed after an application "A" has been carried out, data about a correspondence relationship between the data of the application A and the data of the application B may be stored in the translator mapping information table 12. In this case, since the data of the application A can be transferred to the application B without executing the data conversion into the flow data, a total process operation can be reduced, so that the entire processing speed can be increased.

As an example of data which is required to be converted, the following data may be conceived. That is, one data is a product name expressed by character string data and the other data is a product code expressed by binary data, namely formats of these data are different from each other. Also, one data corresponds to a total number of products whereas the other data corresponds to a total price amount, namely, contents of these data are different from each other. In the case that the formats of the data are different from each other, both the correspondence relationship of the respective data and the formats of the respective data may be stored in the translator mapping information table 12. On the other hand, when the contents of the data are different from each other, both the correspondence relationship of the respective data and a calculation formula (for example, total price amount=quantity×unit price) may be stored into the translator mapping information table 12. The data translator 11 may execute the data conversion in accordance with the storage content of the table.

The application initializing/ending process operations executing unit 8 may provide such an interface used to execute the process operation specific to the application 13. The application initializing/ending process operations executing unit 8 previously sets the process operation specific to the application 13, and executes this set process operation in accordance with the set sequential order. The application status notifying unit 7 requests the workflow managing server 1 to change a status of a corresponding work item in accordance with both a start and an end, which are notified by the application 13 via the application initializing/ending process operations executing unit 8. At this time, the request is issued via the server connection managing unit 4.

FIG. 3 represents a detailed content of the process data mapping information table 10. The process data mapping information table 301 is constituted by a plurality of mapping tables 302 which are defined with respect to each of work items. Each of these mapping tables 302 is made of data present/absent information, data item name list information, and type identifier list information. The data present/absent information indicates as to whether or not flow data with respect to a work item is present. The data item name list information indicates such a data item name which is handled by a work item. The type identifier list information represents such data formats of the respective items. Then, the above-explained information is constituted by "reading time" used when the information is read from the database 9, and also "writing time" used when the information is written into the database 9.

FIG. 4 represents a detailed content of the translator mapping information table 12. The translator mapping information table 401 is constituted by a plurality of mapping tables 402 which are defined with respect to each of work items. Each of these translator mapping information tables 402 is made of data conversion information, conversion source type list information, and conversion destination type list information. The data conversion information indicates as to whether or not the conversion is required. The conversion source type list information indicates a format of data before conversion. The conversion source type list information indicates a format of data after conversion. Furthermore, the above-described information is constituted by "inputting time" used before a process operation is executed by an application, and "outputting time" used after a process operation is executed by an application.

It should also be noted that the translator mapping information table shown in FIG. 4 exemplifies such a case that the formats of the data are different from each other. When the contents of the data are different from each other, the calculation formula may be stored in the translator mapping information table. In general, the contents of this translator mapping information table are different from each other, depending upon the way how to utilize the present invention. For example, while a formula used to calculate an interest, another formula used to calculate a total amount of sales, and a further formula used to settle a travel expense are stored in this translator mapping information table, these stored formulae may be employed, if necessary.

For instance, in such a case that the present invention is applied to such a business as a settlement of a travel expense, the travel expense settlement business may be carried out as follows: While as input data, a departure place name, a destination place name (otherwise, character string data such as boarding station name and getting-off station name), and stay days are received, both necessary data and necessary formulae are stored in the respective information tables. As the necessary data, there are location names, station names, distance data, travel fees, stay fees, and transportation means. As the necessary formulae, the travel expenses may be calculated.

The data translator managing unit 6 judges as to whether or not the flow data is supplied to the data translator 11 by referring to the relevant table with respect to the work item which is requested to be commenced. The reading-time type identifier list of the process data mapping table 302 must be made coincident with the inputting-time conversion-source type list of the translator mapping table 402. Also, the outputting-time conversion-destination type list of the translator mapping table 402 must be made coincident with the writing-time type identifier list of the process data mapping table 302.

Figure 2:
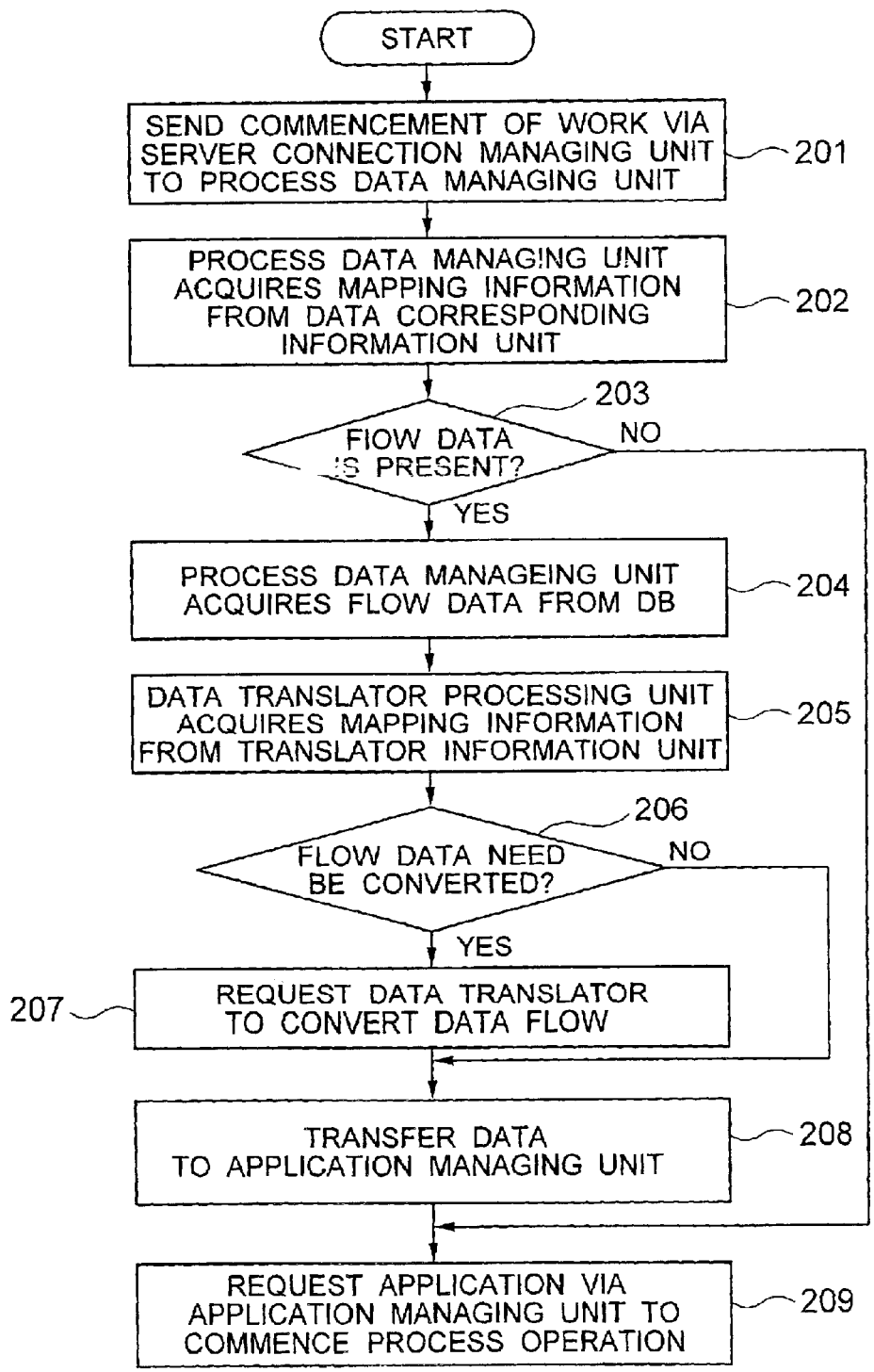
FIG. 2 is a flow chart for explaining a process operation of a server connecting unit.

FIG. 2 is a flow chart for explaining a process flow operation executed in the case that the server connecting unit 2 of FIG. 1 initiates an application program. When the workflow managing server 1 commences a work item in accordance with process data stored in the database 9, a request for commencing the work item is sent to the process data managing unit 5 via the server connection managing unit 4 which is previously defined in correspondence with each of the work items of such a process defined by the workflow managing server 1. When the process data managing unit 5 receives the request for starting the work item (step 201), this process data managing unit 5 acquires such mapping information from the process data mapping information table 10 (step 202), and this mapping information corresponds to such a work item which is requested to be commenced. Then, the process data mapping unit 5 judges as to whether not there is flow data corresponding to the work item with reference to the acquired mapping information. When such flow data is not present, the process data managing unit 5 requests the application managing unit 3 to commence the process operation of the application 13 (step 209). When the process data managing unit 5 judges that there is the relevant flow data, this process data managing unit 5 acquires such flow data corresponding to the work item from the database 9 (step 204). Thereafter, the data translator managing unit 6 acquires the mapping information corresponding to the work item from the translator mapping information table 12 (step 205). The data translator managing unit 6 judges as to whether or not the flow data is required to be converted into such data specific to the application 13 by referring to the acquired mapping information (step 206). When the data translator managing unit 6 judges that this flow data is required to be converted into the specific data, the data translator managing unit 6 supplies the flow data to the data translator 11 so as to request the data converting operation (step 207). To the contrary, when the data translator managing unit 6 judges that this flow data need not be converted into the specific data, no conversion request is issued to the data translator 11. Then, the data translator managing unit 6 supplies to the application managing unit 3, either the converted data specific to the application 13 or the flow data which is judged not to be converted (step 208). Thereafter, the data translator managing unit 6 requests the application managing unit 3 to commence the process operation of the application 13 (step 209).

Figure 11:
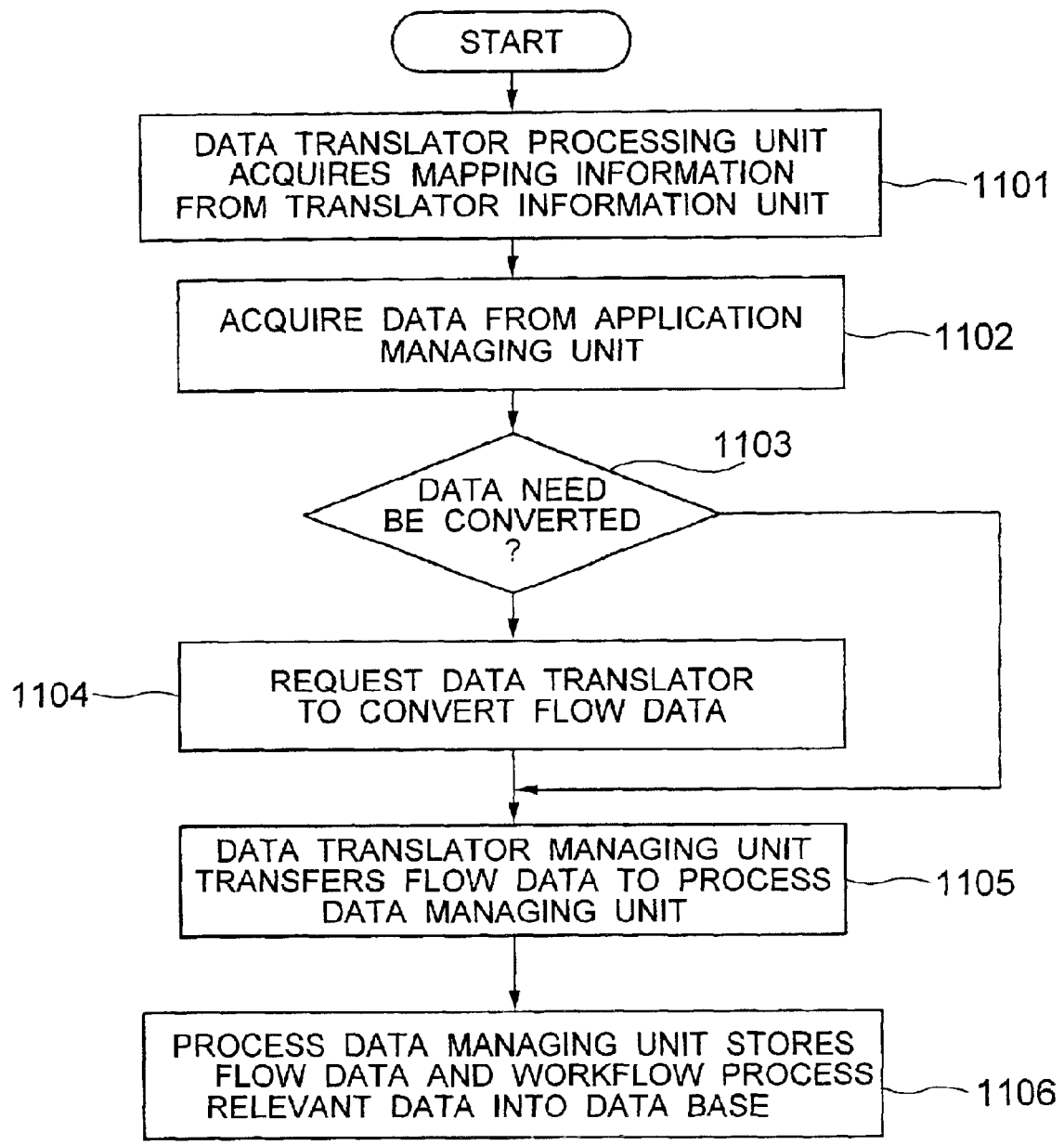
FIG. 11 is a flow chart for describing a process operation of a server connection.

FIG. 11 is a flow chart for explaining a process flow operation executed after the server connecting unit 3 receives data from an application program.

Upon receipt of data through the application managing unit 3 (step 1101), the data translator managing unit 6 acquires mapping information from the translator mapping information table 12 (step 1102), and judges as to whether or not the received data is converted into the flow data (step 1103). When the received data need not be converted into the flow data, the process operation is advanced to a process operation defined at a step 1105 so as to be executed. When the received data is required to be converted into the flow data, the data translator managing unit 6 requests the data translator to convert the received data into the flow data (step 1104). Next, the data translator managing unit 6 transfers the converted flow data to the process data managing unit 5. The process data managing unit 5 which receives the flow data stores both the flow data and the workflow process relevant data into the database 9 in correspondence with each other with reference to the process data mapping information table 10.

Figure 5:
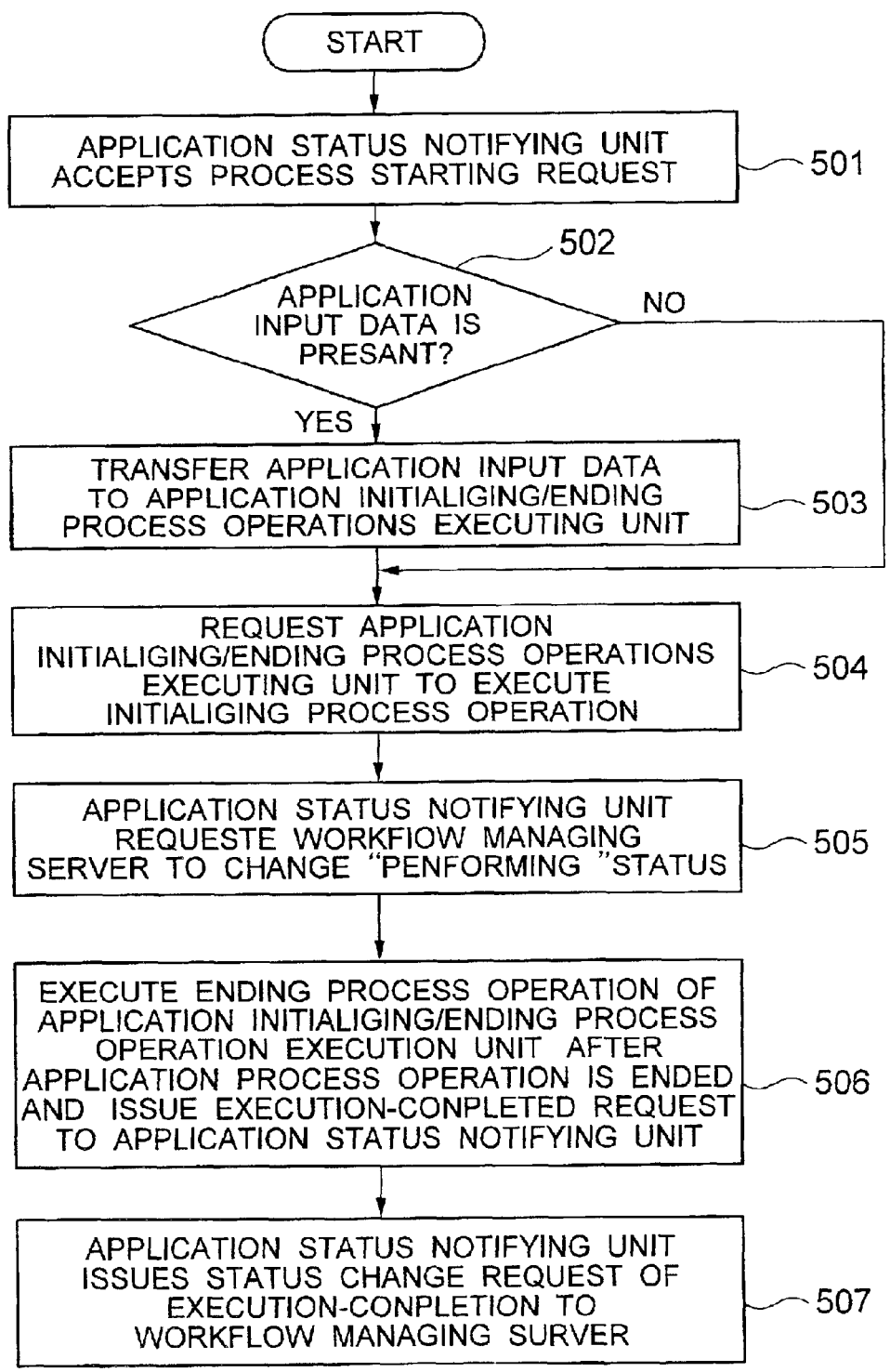
FIG. 5 is a flow chart for describing a process operation of an application program managing unit.

FIG. 5 is a flow chart for explaining a process flow operation of the application managing unit 3 shown in FIG. 1.

When the application status notifying unit 7 receives a request for commencing the process operation of the application 13 from the server connecting unit 2 (step 501), the application status notifying unit 7 judges as to whether or not there is data inputted to the application (step 502). AT this time, when the data is transferred in the process operation 208 shown in FIG. 2, the application status notifying unit 7 transfers the input data to the application initializing/ending process operation executing unit 8 (step 503). To the contrary, when such input data is not present, the process operation defined at the step 503 is not executed. Thereafter, the application managing unit 3 requests the application initializing/ending process executing unit 8 to execute a present initializing process operation specific to the application 13 (step 504). Next, the application status notifying unit 7 requests to change such a status that the execution of the relevant work item has been commenced. This request is sent via the server connection managing unit 4 to the workflow managing server 1, and thus, the workflow managing server 1 changes the status of this relevant work item into such a status that the execution of this work item has been commenced. When the process operation of the application 13 is ended, an ending process operation specific to the application 13 is performed which is previously set to the application initiating/ending process executing unit 8, and then, the work flow managing server 1 issues a request for completing the execution to the application status notifying unit (step 506). Then, the application status notifying unit 7 issues a status changing request of an execution end (step 508). The status change request of the execution end is transmitted via the server connection managing unit 4 to the workflow managing server 1.

It should also be noted that the process operations indicated in FIG. 5 may be stored in the form of a computer program into a computer readable storage medium such as a floppy disk, an optical disk, and a magnetic disk. Also, the process operations indicated in FIG. 2 and FIG. 11 may be realized in the form of a computer program, and/or this computer program may be stored in a storage medium.

As previously descried in detail, in accordance with the present invention, since the data can be converted, it is possible to construct such a system that either the formats of the data or the contents of the data used among the applications are different from each other. As a result, since the existing applications can be freely utilized, the resources of these applications can be effectively used. Also, such a portion which is not depending upon an application can be commonly utilized.

Further, it is possible to constitute a system in which the data used in the workflow managing server 1 is different from the data used in the application, or another system that the data utilized among the applications are different from each other. As a consequence, since the existing applications can be freely utilized, the resources of these applications can be effectively used. In addition, since either one application or plural applications which are different every work item can be executed, the complex work items can be executed.

Also, the portions except for the process data mapping information table made depending upon the application, the translator mapping information table, and the application initializing process/ending process operations do not depend upon the application. As a result, the system can be constituted, or provided by employing the commonly-used hardware, or the commonly-used software. In other words, it is possible to constitute, or provide such a system having a superior general-purpose characteristic when the process data mapping information table, the translator mapping information table, and the application initializing process/ending process operations of the application integration apparatus are changed in response to the application.

In the foregoing descriptions, the basic arrangement of the present invention has been explained. Next, a description will be made of several utilization examples of systems to which the present invention is applied.

FIG. 6A to FIG. 6D illustratively show an example of systems which integrates workflow managing servers with applications, while four sorts of interfaces owned by the application initializing/ending process operations executing unit 8 are employed, depending upon differences in interfaces owned by an application 13.

Figure 6A:
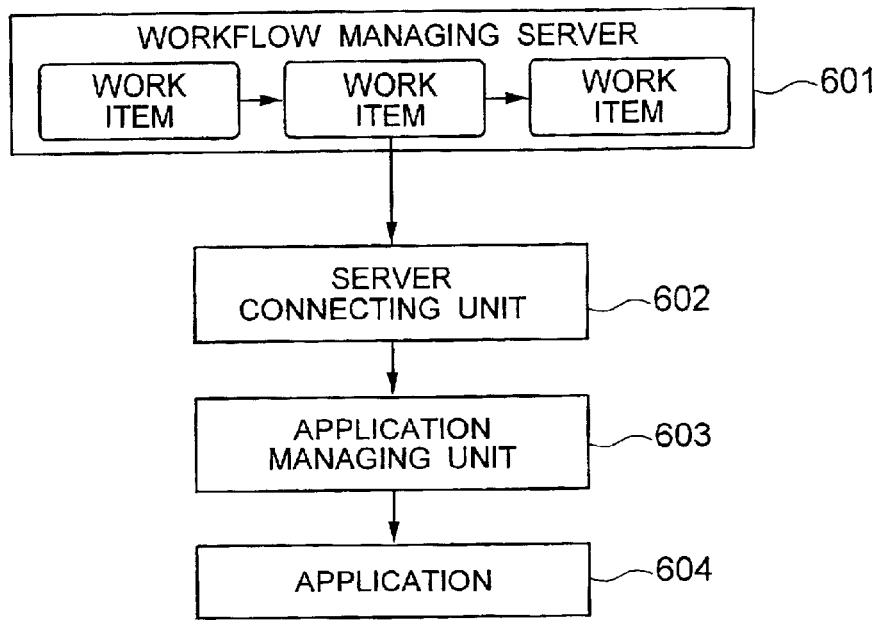
FIG. 6A to FIG. 6D is a flow chart for explaining an integration example between a workflow management server and an application program.
Figure 6B:
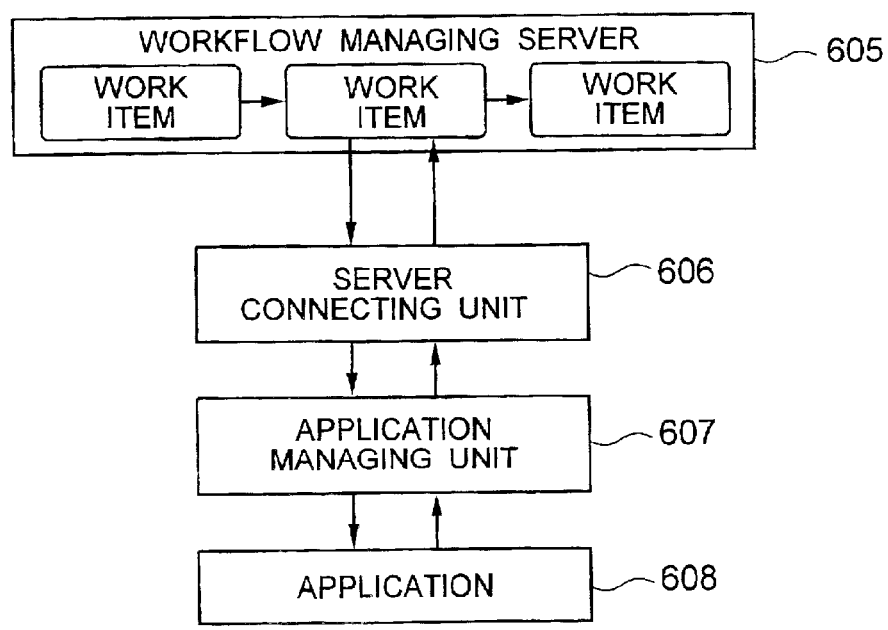
Figure 6C:
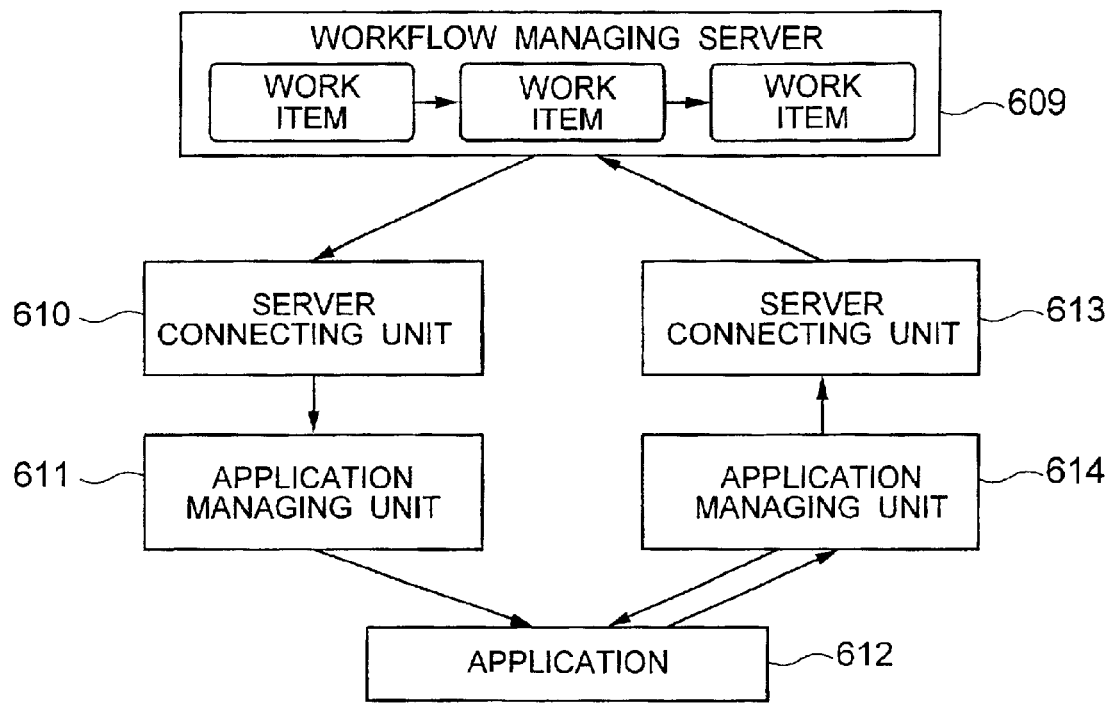
Figure 6D:
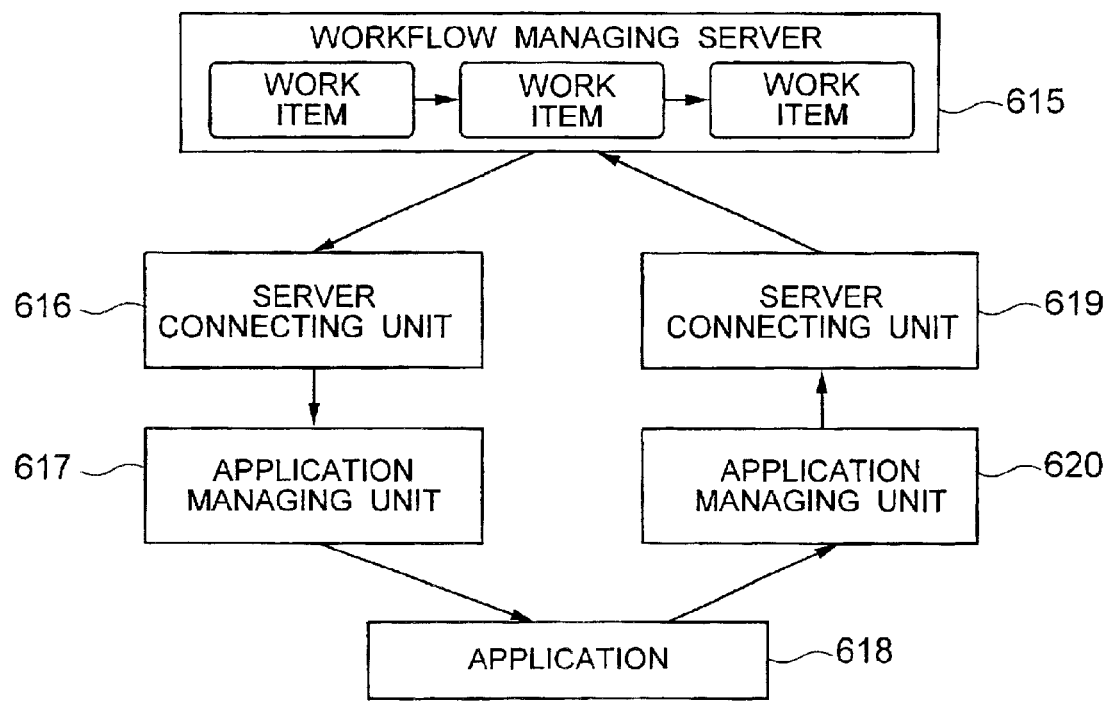

It should be understood that a workflow managing server 601 of FIG. 6A, a workflow managing server 605 of FIG. 6B, a workflow managing server 609 of FIG. 6C, and a workflow managing server 615 of FIG. 6D are similar to the workflow managing server 1 of FIG. 1. Also, it should be noted that a server connecting unit 602 of FIG. 6A, a server connecting unit 606 of FIG. 6B, a server connecting unit 610 and a server connecting unit 613 of FIG. 6C, a server connecting unit 616 and a server connecting unit 619 of FIG. 6D are similar to the server connecting 2 of FIG. 1. Further, it should be noted that an application managing unit 603 of FIG. 6A, an application managing unit 607 of FIG. 6B, an application managing unit 611 and an application managing unit 614 of FIG. 6C, an application managing unit 617 and an application managing unit 620 of FIG. 6D are similar to the application managing unit 3 of FIG. 1.

FIG. 6A illustratively shows an integration example (will be referred to as a "chained process model" hereinafter) in which the workflow managing server 1 sends a starting request via the server connecting unit 2 to the application 13, and the workflow managing unit 1 transits a process to a next work item without waiting for the completion of the application 13. The starting request of the application 13 is sent from the workflow managing server 1 via both the server connecting unit 2 and the application initializing/ending process operations executing unit 8 to the application 13. At this time, in order to commence the application 13, an initializing process operation is utilized which is installed by the user while using an installing model for the chained process model. For instance, in the case that a process operation for executing the chained processes is realized by a computer program, the application managing unit 603 may install such a computer program capable of executing only an initiating process operation of the application 604. Alternatively, in the case that the application managing unit 603 is already initiated, the application managing unit 603 may install a program capable of executing only a data transmission process operation with respect to the application 604. After the application managing unit 3 has issued the starting request to the application 13, this application managing unit 3 issues a status changing request of an execution end via the server connecting unit 2 to the workflow managing server 1 without waiting for the completion of the application 13. The chained process model may be applied to such a case that the application 13 does not own the output data obtained when the execution is completed.

As an example of FIG. 6A, the following integration case may be conceived. For example, in the case that the user wants to use both the application 604 and the application managing unit 603 as the chained process model, the application managing unit 603 initiates the application 604, and transmits the data obtained from the server connecting unit 602 to the application 604. Thereafter, the application managing unit 603 notifies to the server connecting unit 602, such a fact that the process operation from the application managing unit 603 with respect to the application 604 has been accomplished. Then, the server connecting unit 602 which receives this notification may notify the workflow managing server 601 which transits the process operation to the next work item.

Alternatively, the application managing unit 603 establishes a communication connection with respect to the application 604 which has already been initiated, and transmits the data acquired via the server connecting unit 602. After the data has been transmitted, this application managing unit 603 executes a close process operation of the communication connection, and thereafter, notifies such a fact that the process operation with respect to the application 604 has been accomplished to the server connecting unit 602. Then, the server connecting unit 602 which receives this notification may notify the workflow managing server 601 which transits the process operation to the next work item.

The above-explained information for notifying the transition of the next work item with respect to the workflow managing server 601 may contain information as to a work item status, and information which is used to specify a subject/work item. For instance, as an example of the information about the work item status, there are provided "ready", "performing", "completed", and the like. Also, in order to make a discrimination between the request for changing the work item status and the work item/subject, there are provided "work ID" and "subject ID."

As an example in which this request for changing the work item status is installed, for instance, the application managing unit 603 transmits such data which contains "performing and completed", and "work ID and subject ID" as the status changing request to the workflow managing server 601 in response to the initiation of the application 604. The workflow managing server 601 which receives the above-explained data retrieves the status information corresponding to the above-explained "work ID/subject ID" from the work status management information which is owned by such a work status management file saved from the workflow managing server into the database. Then, this workflow managing server 601 changes the above status information from "ready" via "performing" to "completed." When the status information is equal to "completed", the workflow managing server advances the process operation to the next work item.

As previously explained, while the application managing unit transmits the notification of "performing and completed", the workflow managing server which receives this notification may transit the status condition from "ready" via "performing" to "completed."

Also, while the application managing unit 603 notifies "commencement" via the server connecting unit 602 to the workflow managing server, the workflow managing server which receives the notification of "commencement" changes the status information into "performing", and changes the status information into "completed" in the case that the notification of "completed" is received. That is, when the requests for the respective status transitions are received. The workflow managing server may changes the status information.

As previously explained, since the status information is managed by the server with respect to each of the work items and each of the applications, the following management information can be acquired with respect to the work items, namely, which work item is being processed, and which work item requires lengthy time. For instance, in such a case that working time becomes long, since a heavy load is given to a computer under operation, such management information may be used so as to judge that the working time becomes long. In other words, the status information may be employed in order to grasp the progress condition of the work item, and also to judge a failure occurred in an application and a computer, which execute the respective work items.

The above-explained the status changing request transmitted by the application managing unit via the server connecting unit to the workflow managing server may be applied to other cases than the chained process model.

FIG. 6B is an integration example in which the workflow managing server 1 sends a starting request via the server connecting unit 2 to the application 13, and thereafter, the workflow managing server 1 transfers a process operation to a next work item after waiting for the end of the application 13. At this time, the user installs both the initializing process operation and the ending process operation, which are specific to the application 13, as one process operation. As a result, after the application status notifying unit 7 employed in the application managing unit 3 of FIG. 1 has sent an execution starting request to the application 13, this application status notifying unit 7 issues a status changing request of an execution end to the workflow managing server 1 subsequent to the ending process operation of the application 13, while no request is issued as to a status change of "performing" to the workflow managing server 1. This operation is referred to as a "nested subprocess synchronous model." The "nested subprocess synchronous model" may be applied to the following two cases: In one case, the application 13 owns such an interface that the process operations defined from the execution starting request up to the end request are carried out by a single operation. In another case, a time period defined from the execution start of the application 13 until the end of this application is short.

For instant, when the user installs the integration system of FIG. 6B, the application managing unit 607 supplies data "A" to the application 608 and receives a process result of this data "A", and then issues an instruction request via the server connecting unit 606 to the workflow server, by which the process operation is advanced to the next work item. In other words, since the application managing unit 607 can acquire a process result of the data "A" corresponding to such data "A" which should be processed, this integration system may become effective in such a case that input/output data with respect to the application 608 are wished to be synchronized with each other. In this case, since the application managing unit 607 waits for the process operation until the process operation of such data supplied to the application is completed, the nested subprocess synchronous model may be applied to such a case that the process time of the application is short, resulting in a merit.

It should be noted that when the user installs the integration system of FIG. 6B, the user may install a computer program operable as follows:

(1). In response to such a fact that the application managing unit 607 initiates the application 608, this application managing unit 607 notifies "commencement" to the workflow managing server 605, whereas the workflow managing server which receives the notification of "commencement" changes the status information into "ready."

(2). In response to such a fact that the application managing unit 607 transmits the data to be processed to the application 608, the application managing unit 607 notifies "performing" to the workflow managing server 605, whereas the workflow managing server 605 which receives the notification of "performing" changes the status information into "performing."

(3). The application managing unit 607 receives the data about the process result from the application 608, and transmits both the received data of the process result and the notification of "completed" to the workflow managing server 605, whereas the workflow managing server 605 which receives both the data of the process result and the notification of "completed" changes the status information into "completed" in connection with the reception of the notification of "completed", and stores the data of the process result into the database, and further, advances the process operation to the next work item (if necessary, workflow managing server 605 notifies commencement of work item to program by which next work item is executed).

FIG. 6C represents an example of the integration system case. That is, although the transition manner of the process executed in the workflow managing server 1 is the same that of the rested subprocess synchronous model, a request of "completed" is issued to the application status notifying unit 7 shown in FIG. 1 by the following manner (will be referred to as a "nested subprocess asynchronous pull model" hereinafter). In this pull model, while the ending process operation of the application 13 is installed as a separate adaptor, the application initializing/ending process executing unit 8 shown in FIG. 1 inquiries the end of the application 13 to this application 13. In the nested subprocess asynchronous pull model, the execution starting request to the application 13 is realized by employing the above-explained "chained process model", whereas the end inquiry to the application 13 is realized by employing such a process operation in the application initializing/ending process operations executing unit of FIG. 1, which is installed by the user in accordance with the inquiry model. It should be noted that how to communicate between the application and the application managing unit may be made different from each other, depending upon the communication method. For instance, in the case that a communication is carried out by a socket between an application and an application managing unit, the application managing unit may be installed in response to a used communication system, for example, in such a case that a communication is performed by ORB. Also, as to a content of data to be transmitted/received, a data format and the like may be similarly changed in response to an application.

The nested subprocess synchronous pull model may be applied to such a case that the application 13 does not own the interface used to notify the end, and also another case that the time period defined from the execution commencement of the application 13 until the execution end of this application 13 is long.

In the case that FIG. 6C is realized, as a portion of transmitting the data to the application 612, both the server connecting unit 610 and the application managing unit 611 may be realized by a single thread (will be referred to as a "data transmission thread" hereinafter), whereas as another portion of transmitting a process result request to the application 612 and of receiving a process result, both the application managing unit 614 and the server connecting unit 613 may be realized by another thread (will be referred to as a "process result reception thread" hereinafter).

For instance, while the "data transmission thread" may transmit data to be processed with respect to the application 612, the "process result reception thread" may transmit the process result reception request to the application 612 every time a predetermined time period has passed, and then may receive the data of the process result from the application 612 in response to the above-explained process result reception request. Alternatively, this "process result reception thread" may access a file of the process result stored by the application 612 so as to acquire the necessary data. It should be understood that in the description of FIG. 6C, the expression of "thread" is employed as the operation unit of the program. Alternatively, while a single program produces a plurality of threads, the data transmission process operation and the process result reception process operation may be carried out by multiple threads.

Such an installation becomes effective in the case that the application 612 receives a plurality of data to execute a process operation, and stores a plurality of process results.

For instance, the following assumption is made in such a case that a work of a travel expense settlement is carried out. That is, the "data transmission thread" transmits to the application 612, such data which should be processed and contains numeral data of the travel expense and company staff numbers, whereas the application 612 stores a process result file as a process result of the received data to be processed. This process result file is to establish a correspondence relationship between a total amount of travel expense settlements and the company staff numbers. The "process result reception thread" accesses to the process result file every time a predetermined time has passed until a process result capable of satisfying a condition of a total amount of money is stored into the process result file. The "process result reception thread" accesses the process result file to confirm as to whether or not the data capable of satisfying the condition is stored in the process result file, and further, acquires the data from the process result file. As a result, the application 612 may not own the data transmission function. Also, since the application 612 processes a plurality of data to be processed in the multiple threads and then stores a plurality of process results in the order of the completed process, this installation method may become effective even in the case that the time duration required for executing the process operation with respect to the respective data are different from each other.

When both "data transmission thread" and "process result reception thread" are realized, the following program may be installed. (0). Both "data transmission thread" and "process result reception thread" may be produced in connection with the process starting notification of the workflow managing server (alternatively, thread may be previously produced, if required). (1). The "data transmission thread" initiates the application 612, and notifies "work ID and subject ID" and "start" to the workflow managing server 609 in response to the initiation of the application. The workflow managing server which receives the notification of "start" changes the status information of work item (and subject) corresponding to "work ID and subject ID" into "ready." (2). In response to the transmission of the data to be processed to the application 612, "data transmission thread" notifies both "work ID and subject ID" and "performing" to the workflow managing server 609. The workflow managing server which receives the notification of "performing" changes the status information of the work corresponding to "work ID and subject ID" into "performing." (3). The "process result reception thread" accesses the process result file into which the application 612 stores the process result every preselected time. (4). The "process result reception thread" acquires the data of the process result from the process result file based upon a predetermined condition, and transmits the data about the process result, and also notifications of "work ID and subject ID" and "completed" to the workflow managing server. (5). In response to the notification of "completed", the workflow managing server changes the status information of the work item (otherwise subject) corresponding to "work ID and subject ID" into "completed", and also stores the data of the process result into the database, and further, advances the process operation to the next work item (workflow managing server notifies work commencement to program by which next work item is carried out, if necessary).

It should also be noted that the realizing method described in this specification is one of typical examples, and therefore, the present invention may be realized by employing other methods.

FIG. 6D represents an example of the integration system case. That is, although the transition manner of the process executed in the workflow managing server 1 is the same as that of the nested subprocess synchronous model, a request of "completed" is issued to the application status notifying unit 7 shown in FIG. 1 by notifying the "end" to the application initializing/ending process operations executing unit 8 (will be referred to as "nested subprocess asynchronous push model" hereinafter). In the nested subprocess synchronous push model, the execution starting request to the application 13 is realized by employing the above-explained "chained process model", and the end notification sent from the application 13 is realized by employing the specific interface owned by the application 13 and also by employing such a process operation in the application initializing/ending process operations executing unit of FIG. 1, which is installed by the user in accordance with the push model. The nested subprocess asynchronous push model may be applied to such a case that the application 13 owns the interface used to notify the end, and also another case that the time period defined from the execution commencement of the application 13 until the execution end of this application 13 is prolonged.

When FIG. 6D is realized, there is an advantage that the process result of the application 616 is queued. While both the server connecting unit 616 and the application 617 are installed as one thread (input data transmission thread) and both the server connecting unit 619 and the application managing unit 620 are installed as another thread (process result reception thread), it is so assumed that the respective processes are independently operated. It is so assumed that the input data transmission thread inputs a plurality of data into the application 618, whereas the application 618 queues the inputted data in the order of the processed data. The process result reception thread may receive the process result in the order of the queued data, and also may transmit both the process result and the transmission request to the next work item via the server connecting unit 619 to the workflow managing server. As a consequence, this integration method becomes effective in such a case that the input data into the application 618 need not be made in correspondence with the process result data (Note that in description of FIG. 6D, expression of "thread" is employed as operation unit of program).

Figure 7:
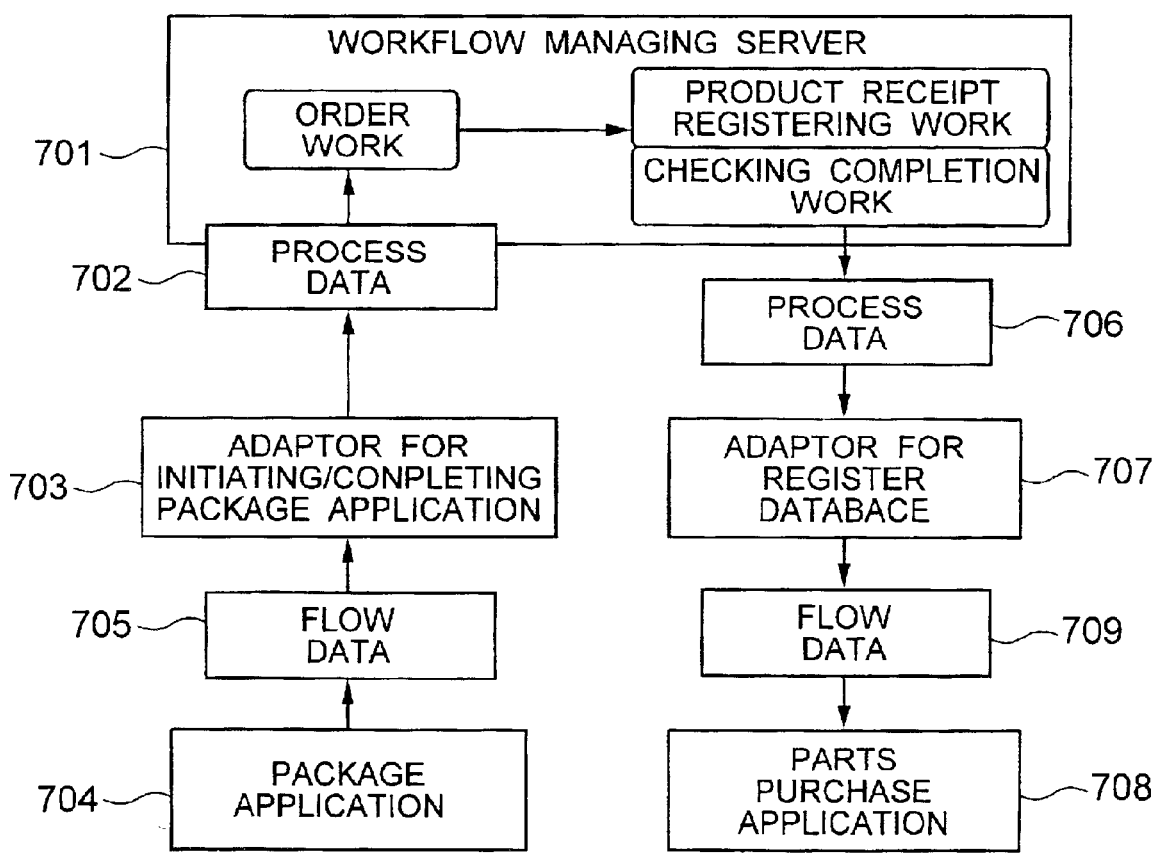
FIG. 7 is a flow chart for explaining an example of a business process.

FIG. 7 represents an example of a process operation of a business process. In FIG. 7, an expression "business process" implies a flow of a work. This business process illustrates a simple business process example defined by an order business through a parts purchase business. A basic arrangement of a system for executing this business process is identical to that shown in FIG. 1. Both a package application initiating/completing adaptor 703 and a database registering adaptor 767 correspond to the application integration apparatus 14 of FIG. 1, and basically owns similar structures/processing functions to those of this application integration apparatus 14 of FIG. 1. The package application 704 is employed in order that an ordering product is registered, and also a registered product is read. This package application 704 may be initiated/completed via the package application initiating/completing adaptor 703 based upon a request issued from the workflow managing server 701. Also, this package application 704 may be directly initiated and/or completed by a user (not shown in detail). Also, the parts purchase application 708 is employed in order that a received product is registered, and also a registered product is read. Also this parts purchase application 708 may be initiated/completed in response to a request issued from the workflow managing server 701, and may be directly initiated/completed by a user (not shown).

Figure 12:
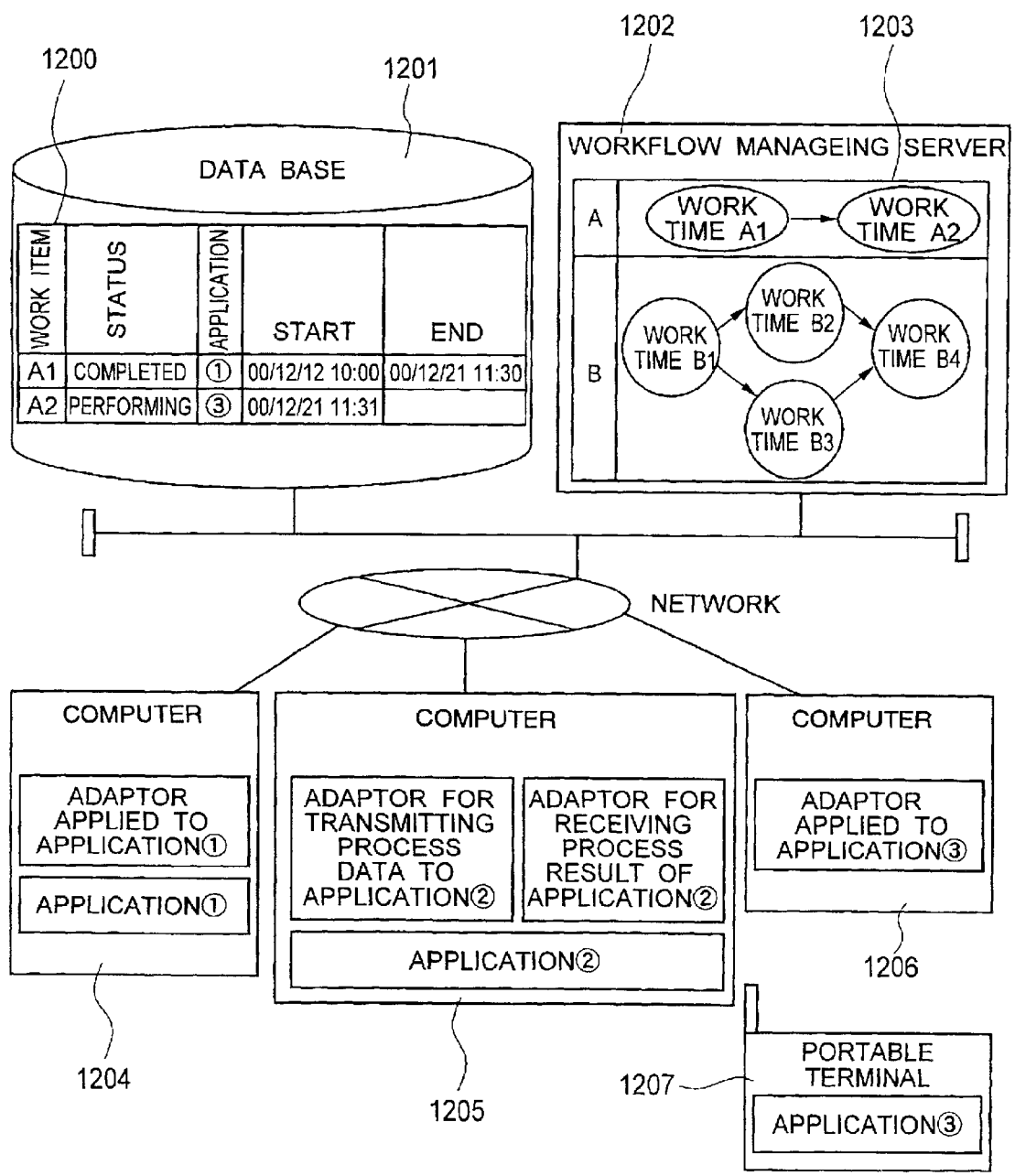
FIG. 12 illustratively shows an example of an arrangement to which the present invention is applied.

FIG. 12 illustrates an example of a system arrangement to which the present invention is applied. A workflow managing server 1202 manages a plurality of business processes 1203. A database 1201 contains such management information 1200 as work items, status information, applications used in work items, starting date/time, and end date/time. Although not shown in the drawing, this database 1201 manages data which are used in the business process. It is so assumed that both computers 1204 and 1205 contain applications capable of executing workflow works, and programs having functions of adaptor which correspond to these applications. Further, as indicated in this drawing, both another computer 1206 and a portable terminal 1207 may not be operated on the same computers with respect to applications and adaptors.

The management information 1200 may be realized by storing status information into the database 1201, which is transmitted from the respective adaptors to the workflow managing server. Since the workflow managing server receives the status information from the plural adaptors corresponding to the plural applications, the workflow managing server itself need not inquires an execution status of an application with respect to each of the applications. In the management information 1200 shown in FIG. 12, the applications are made in relation to the statuses. Alternatively, while a status of an adaptor is transmitted from this adaptor to the workflow managing server, a work item, the adaptor, and the application may be made in relation to each other so as to be managed.

FIG. 8A and FIG. 8B indicate a process data mapping information table. FIG. 8A shows a process data mapping information table which is used in the package application imitating/completing adaptor 703, and FIG. 8B indicates another process data mapping information table which is used in the parts purchase application 708. As indicated in FIG. 8A, the data handled in the package application 704 correspond to a product code, a quantity, and a unit price, which are indicated by binary data. Also, as shown in FIG. 8B, the data handled in the parts purchase application 708 correspond to a product model name, a quantity, and a total price amount, which are expressed by binary data.

FIG. 9A and FIG. 9B indicate a translator mapping information table. FIG. 9A shows a translator mapping information table which is used in the package application initiating/completing adaptor 703, and FIG. 9B indicates another translator mapping information table which is used in the parts purchase application 708. As indicated in FIG. 9B, a total price amount handled in the parts purchase application 708 may be calculated based upon both a quantity and a unit price, which are handled by the package application 704. In other words, in this case, co-operation among the applications in which contents of data are different from each other may be realized.

Next, a description will now be made of a process operation shown in FIG. 7. A basic process flow of FIG. 7 is identical to those indicated in FIG. 2, FIG. 5, and FIG. 11.

A user who sends to order parts may directly initiate the respective package applications, and then may register an ordering product code, a quantity, and a unit price.

On the other hand, when the workflow system is operated so as to perform both a product ordering work and a product receiving work, the workflow managing server 701 executes the ordering work. This ordering work corresponds to such a work that the ordered product which is registered by the user is confirmed. When the ordering work is carried out, the workflow managing server 701 requests the package application initiating/completing adaptor 703 to read out the product registered in the package application 704. This package application initiating/completing adaptor 703 confirms as to whether or not flow data is present by referring to the process data mapping table of FIG. 8A. In this case, since such an indication is made that the flow data is not contained in the process data mapping table, the package application initiating/completing adaptor initiates the package application 704 so as to read data related to a product code, a quantity, and a unit price. When the package application initiating/completing adaptor completes the data reading operation for all of the data about the product code, the quantity, and the unit price, the package application 704 sends an end notification to the package application initiating/completing adaptor 703. The package application initiating/completing adaptor 703 executes a converting operation of the data 705 which is received from the translator mapping information table shown in FIG. 9A, and then produces process data 702 based upon this converted data, and such data required by the workflow managing server 701 to change the status of the ordering work, and thereafter transfers this process data 702 to the workflow managing server 701 the workflow managing server 701 changes the status of the ordering work into the completed status, and brings both a product receipt registering work and a checking completion work, which are equal to the next work item, into a "ready" status. As to the product receipt registering work and also the checking completion work, in such a case that products are received which can satisfy the conditions of the product code, the quantity, and the unit price, which correspond to data constituting the process data, the product code is converted into the product model by the externally-supplied input. As a result, the product code is registered into the database as the data related to the product model, the quantity, and the total price amount. In other words, since the product code is converted into the product model, the product receipt work and the checking work may be accomplished.

When a product model is entered from an external unit, the workflow managing server 701 which has executed both the product receipt registering work and the checking completion work requests the database registering adaptor 707 the register the product model, the quantity, and the total price amount.

The database registering adaptor 707 which receives the above-explained request confirms as to whether or not the flow data is present by referring to the process data mapping information table shown in FIG. 8B. In this case, such an indication is made that the flow data is present in the process data mapping table. As a result, the database registering adaptor 707 derives the flow data from the process data. In this case, the product model, the quantity, and the unit price may constitute this flow data. Next, this database registering adaptor 707 judges as to whether or not the flow data should be converted by referring to the translator mapping information table indicated in FIG. 9B. In this case, since such an indication is made that the flow data should be converted, that flow data is converted into such data specific to the application by utilizing the translator mapping information table. In this case, a data conversion is carried out in such a manner that a total price amount is calculated from a quantity and a unit price. Next, the database registering adaptor 707 initiates the parts purchase application 708 so as to register the product model, the quantity, and the total price amount.

When the process operation of the parts purchase application 708 is ended, the database registering adaptor 707 requests the workflow managing server 701 to change both the status of the product receipt registering work and also the status of the checking completion work into "completed" statuses. Upon receipt of this request, the workflow managing server 701 changes both the status of the product receipt registering work and the status of the checking completion work into the "completed" statuses.

As previously described, in accordance with the present invention, it is possible to constitute such a system capable of mutually executing a plurality of application programs, the data contents of which are different from each other.

The execution result of the first application is converted in order that this converted execution result may be utilized by the second application, and the second application is executed by using the converted execution result. As a result, such applications, the data formation, or the data contents of which are different from each other, can be executed.

Furthermore, in order to convert the execution result of the first application, the item of the data, and the format and/or the content of this data with respect to the second application may be defined. Other items may be commonly used in these applications.

Also, in order to execute an application, both an initializing process operation and an ending process operation of this application may be defined. Other items may be commonly used in applications.

In accordance with the present invention, it is possible to construct such a system capable of effectively utilizing the existing applications.

Also, even in such a case that the applications employed in the respective work items of the workflow are changed and also the data structures employed in the applications are changed, the adaptor portions of the present invention can accept the changes in the applications and also changes in the data structures. As a consequence, the present invention can reduce the work items used to alter the existing workflow server programs.

It should also be noted that since the status change information responding to the operations of the plural applications are transmitted from the adaptor corresponding to the plural applications to the workflow server, this workflow server can manage the statuses of the plural applications, and therefore, can reduce the various operations and the various work-loads, which are required to manage the respective work items (applications) in the large numbers of works as well as in the complex works having the great numbers of applications.

What is claimed is:

1. A program control system for operating a workflow server program end an application program in relation to each other, wherein said workflow server program obtains en operation status of said application program, said operation status being a work ready status, a work performing status and a work completed status, wherein said application program transmits management information to said workflow server program in response to said operation status, wherein said application program transmits a work identifier (ID) and a subject ID of a work and a subject to be processed by said application program and information of said operation status to said workflow server program upon timing of occurrence of each of a plurality of events, wherein, upon reception of said management information, said workflow server program updates, for each work ID, an application program stored in association with said work ID and management information including an ID of a subject to be processed by said application program associated with said work ID, information of said operation status, a work start time and a work completed time, and wherein, when a working period calculated from said work start time and said work completed time exceeds a predetermined period, said workflow server program indicates a work ID, a subject ID and a processing time of said application program for judgment to determine whether a failure has occurred in said application program.

2. A method of controlling a program control system for operating a workflow server program and an application program in relation to each other, said method comprising the steps of:

obtaining an operation status of said application program, said operation status being a work ready status, a work performing status and a work completed status;

transmitting management information to said workflow server program in response to said operation status;

transmitting a work ID and a subject ID of a work and a subject to be processed by said application program and information of said operation status to said workflow server program upon timing of an occurrence of each of a plurality of events; and upon receiving said management information, updating by said workflow server program, for each work ID, an application program stored in association with said work ID and management information including an ID of a subject to be processed by said application program associated with said work ID, said information of said operation status, a work start time and a work completed time; and when a working period calculated from said work start time and said work completed time exceeds a predetermined period, said workflow server program indicates a work ID, a subject ID and a processing time of said application program for judgment to determine whether a failure in said application program has occurred.

3. A program embodied in a computer readable medium comprising:

a workflow server program; and an application program, wherein said workflow server program comprises:

a function of obtaining an operation status of said application program, said operation status being a work ready status, a work performing status and a work completed status, a function that upon reception of management information from an application program, said workflow server program updates, for each work ID, an application program stored in association eth said work ID and management information including an ID of subject to be processed by said application program associated with said work ID, information of said operation status, a work start time, and a work completed time, and a function that when a working period calculated from said work, start time and said work completed time exceeds a predetermined period, said workflow server program indicates a work ID, a subject ID and a processing time of said application program for judgment to determine whether a failure in said application program has occurred, and wherein said application program comprises: a function of transmitting management information to said workflow server program in response to said operation status, and a function of transmitting a work ID and a subject ID of a work and a subject to be processed by said application program and information of said operation status to said workflow server program upon a timing of an occurrence of a plurality of events.

* * * * *